United States Patent
Chen et al.

(10) Patent No.: US 8,421,428 B2
(45) Date of Patent: Apr. 16, 2013

(54) CURRENT TRIGGER CIRCUIT AND SWITCHING POWER CONVERTER USING THE SAME

(75) Inventors: Ji-Ming Chen, Wuxi (CN); Huan-Wen Chien, Taipei County (TW)

(73) Assignee: Green Solution Technology Co., Ltd., New Taipei (TW)

( * ) Notice: Subject to any disclaimer, the term of this patent is extended or adjusted under 35 U.S.C. 154(b) by 546 days.

(21) Appl. No.: 12/723,692

(22) Filed: Mar. 15, 2010

(65) Prior Publication Data

US 2010/0244796 A1    Sep. 30, 2010

(30) Foreign Application Priority Data

Mar. 26, 2009    (TW) .............................. 98109814 A

(51) Int. Cl.
*G05F 1/08*    (2006.01)
*G05F 1/38*    (2006.01)

(52) U.S. Cl.
USPC ............ 323/282; 323/322; 323/351; 323/285

(58) Field of Classification Search .................. 323/282, 323/283, 285, 286, 322, 351
See application file for complete search history.

(56) References Cited

U.S. PATENT DOCUMENTS

| | | | |
|---|---|---|---|
| 6,778,412 B2 * | 8/2004 | Nagai et al. | 363/53 |
| 2003/0026115 A1 * | 2/2003 | Miyazaki | 363/53 |
| 2005/0036342 A1 * | 2/2005 | Uchida | 363/53 |
| 2010/0039735 A1 * | 2/2010 | Trescases et al. | 361/18 |

* cited by examiner

*Primary Examiner* — Adolf Berhane
*Assistant Examiner* — Nusrat Quddus
(74) *Attorney, Agent, or Firm* — Jianq Chyun IP Office

(57) ABSTRACT

A bias voltage is compared with a voltage difference in a detecting element according to the present invention. A bias voltage unit is coupled to the detecting element, so that they have a common voltage level to avoid noises when the circuit is operating. Accordingly, the erroneous detection caused by the noise interference can be avoided. Hence, a detecting element with a low resistance, such as an MOEFET, can be used in the present invention to decrease power consumption arisen from current detection and to further increase conversion efficiency.

16 Claims, 3 Drawing Sheets

CURRENT TRIGGER CIRCUIT AND SWITCHING POWER CONVERTER USING THE SAME

CROSS-REFERENCE TO RELATED APPLICATION

This application claims the priority benefit of Taiwan application serial no. 098109814, filed on Mar. 26, 2009. The entirety of the above-mentioned patent application is hereby incorporated by reference herein and made a part of specification.

BACKGROUND OF THE INVENTION

1. Field of the Invention

The present invention generally relates to a switching power converter and a current trigger circuit, and more particularly, to a switching power converter and a current trigger circuit capable of comparing a bias voltage with a voltage difference in a detecting element to detect a current flowing through the detecting element.

2. Description of Related Art

Please refer to FIG. 1, which is a schematic diagram of a buck DC/DC converting circuit for converting an input voltage VIN to an output voltage VOUT in a related art. The buck DC/DC converting circuit includes a switch SW, an inductor L, a capacitor C, a diode D, a detecting resistor Ri, and a controller CON. The switch SW is switched according to a control signal CONTROL generated by the controller CON to control an amount of electric power transmitted by the input voltage VIN. While the switch SW is conductive, an inductive current $I_L$ flows to the capacitor C through the inductor L and is stored in the capacitor C. While the switch SW is cut-off, electric power stored in the inductor L is transmitted to the capacitor C through the diode D and then stored in the capacitor C. The capacitor C provides power to a load (not shown) with the output voltage VOUT.

In order to avoid unnecessary power consumption due to the saturated inductor L or avoid elements of the buck DC/DC converting circuit from being damaged by an excess current, the controller CON detects an amount of the inductive current $I_L$ passing through the inductor L by means of the detecting resistor Ri. The controller CON has a comparator which compares a voltage difference VS across the detecting resistor Ri with a reference voltage Vref generated by a reference voltage generator. While the inductive current $I_L$ flows through the detecting resistor Ri to have the voltage difference VS across the detecting resistor Ri greater than the reference voltage Vref, the switch SW is cut-off. Owing to the noises on the circuit, voltage levels of the two terminals at the detecting resistor Ri have variations. As a result, the detection easily fails, and the erroneous operation is induced. Therefore, in practice, the voltage difference VS generally has to be greater than 0.2 voltage (even greater than 0.5 voltage or 0.8 voltage), so that the controller CON can effectively avoid the erroneous operation. With current trend that operation voltages of electric elements become lower and lower, the voltage difference across the detecting resistor has a larger percentage and so conversion efficiency of the buck DC/DC converting circuit becomes lower. How to provide a detecting circuit with high conversion efficiency thus becomes an inevitable issue in compliance with the current trend that the operation voltages of the electric elements become lower and lower.

SUMMARY OF THE INVENTION

Accordingly, comparison of the voltage difference with the reference voltage is easily affected by noises in the related art while detecting the current. In the present invention, a voltage difference in a detecting element is compared with a bias voltage, so that the above-described issue is avoided. Accordingly, it is able to decrease power consumption arisen from current detection and to further increase conversion efficiency.

One exemplary embodiment consistent with the present invention provides a switching power converter including a converting circuit, a current trigger circuit, and a processing circuit. The converting circuit converts an input voltage to an output voltage according to a control signal. The converting circuit has a detecting element, and the detecting element has a first detecting end and a second detecting end. The current trigger circuit includes at least one bias voltage unit and a trigger unit. Each of the bias voltage units is coupled to the first detecting end and provides a bias voltage signal. The trigger unit is coupled to the at least one bias voltage unit and generates at least one current trigger signal according to the voltage level of the first detecting end, a voltage level of the second detecting end, and the at least one bias voltage signal. The processing circuit receives the at least one current trigger signal generated by the current trigger circuit and generates the control signal according to the at least one current trigger signal.

One exemplary embodiment consistent with the present invention provides a current trigger circuit including a first current source, a first resistor, a second current source, a second resistor, and a comparator. The first current source and the second current source respectively provide a first current and a second current which respectively pass through the first resistor and the second resistor, so that a first bias voltage and a second bias voltage are generated. The first resistor and the second resistor are respectively coupled to a first detecting end and a second detecting end. The first comparator is coupled to the first resistor and the second resistor, wherein a detecting current passes through a detecting element coupled between the first detecting end and the second detecting end, so that a detecting voltage is generated between the first detecting end and the second detecting end, and the first comparator outputs a first current trigger signal according to the detecting voltage, the first bias voltage and the second bias voltage.

It is to be understood that both the foregoing general description and the following detailed description are exemplary and are intended to provide further explanation of the invention as claimed. In order to make the features and the advantages of the present invention comprehensible, exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
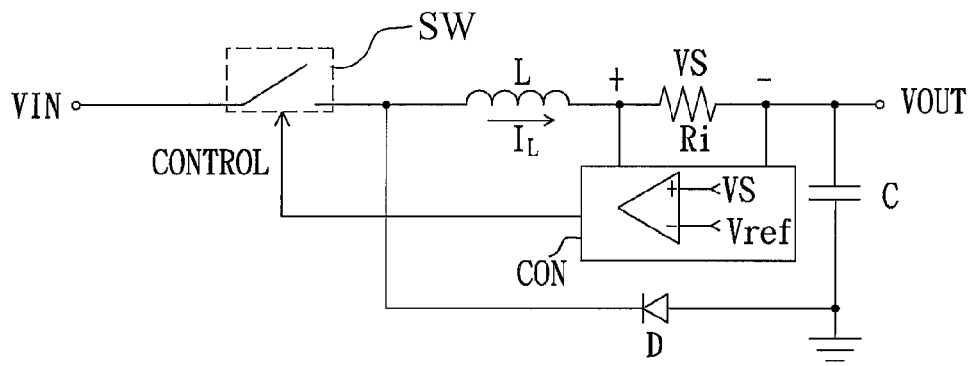
FIG. 1 is a schematic diagram of a buck DC/DC converting circuit in a related art.
Figure 2:
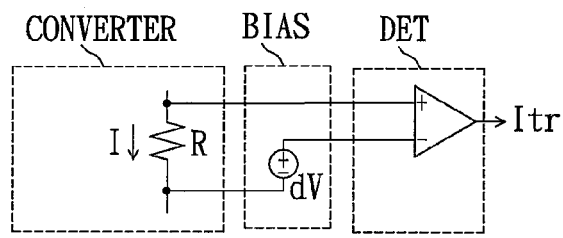
FIG. 2 is a schematic diagram of a current trigger circuit according to an exemplary embodiment consistent with the present invention.

Please refer to FIG. 2, which is a schematic diagram of a current trigger circuit according to an exemplary embodiment consistent with the present invention. The converting circuit CONVERTER has a detecting resistor R, which a current I passes through. A bias voltage unit BIAS has a first detecting end and a second detecting end respectively coupled to two terminals of the detecting resistor R. In addition, the bias voltage unit BIAS provides a bias voltage dV to one of the first detecting end and the second detecting end. A trigger unit DET is coupled to the bias voltage unit BIAS. While a voltage difference I*R across the detecting resistor R is raised up to a level higher than the bias voltage dV, the trigger unit DET immediately generates a current trigger signal Itr with a high level. Since noise interferences from circuits of the first detecting end and the second detecting end coupled to the trigger unit DET are mutually offset, current detection is almost not affected by noises. Accordingly, the current trigger circuit has high immunity against the noise interferences, so that the required voltage difference across the detecting resistor R is decreased during detection, and power consumption of detection is further reduced.

Figure 3:
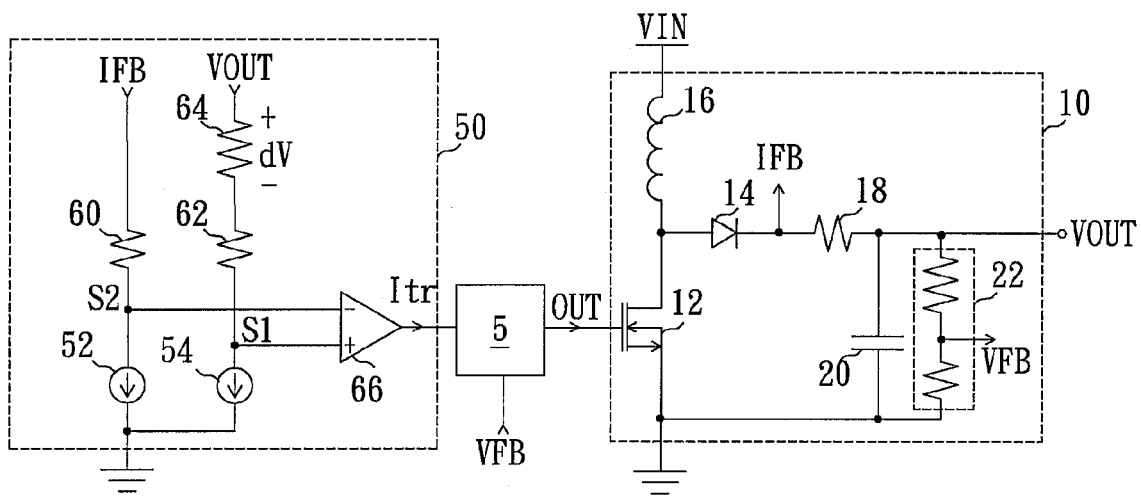
FIG. 3 is a schematic circuit diagram of a switching power converter including a current trigger circuit according to a first exemplary embodiment consistent with the present invention.

Please refer to FIG. 3, which is a schematic circuit diagram of a switching power converter including a current trigger circuit according to a first exemplary embodiment consistent with the present invention. The switching power converter includes a processing circuit 5, a converting circuit 10, and a switching power converter 50. The converting circuit 10 of the present embodiment is a boost DC/DC converting circuit including a switch 12, a diode 14, an inductor 16, a current detecting resistor 18, an output capacitor 20, and a voltage detecting circuit 22. The converting circuit 10 is used to step up an input voltage VIN to become an output voltage VOUT to be output. The switch 12 is switched according to a control signal OUT generated by the processing circuit 5. The current trigger circuit 50 includes a bias voltage unit and a trigger unit, wherein the bias voltage unit includes a first current source 54, a second current source 52, a first resistor 62, a second resistor 60, and a third resistor 64, and the trigger unit includes a comparator 66. The third resistor 64 is coupled to a first detecting end of the current detecting resistor 18 for receiving the output voltage VOUT. The second resistor 60 is coupled to a second detecting end of the current detecting resistor 18 for receiving a current detecting signal IFB. A non-inverse terminal of the comparator 66 is coupled to a connection point S1 between the first resistor 62 and the first current source 54, and an inverse terminal of the comparator 66 is coupled to a connection point S2 between the second resistor 60 and the second current source 52. The comparator 66 generates a current trigger signal Itr according to a comparison result of voltage levels of the connection points S1 and S2. The processing circuit 5 receives a voltage detecting signal VFB generated by the voltage detecting circuit 22 and the current trigger signal Itr so as to generate the control signal OUT. Accordingly, the output voltage VOUT is regulated at a predetermined output voltage, and it is ensured that a current passing through the inductor 16 is not greater than a predetermined maximum current.

In the present embodiment, resistances of the first resistor 62 and the second resistor 60 are equal, and currents of the first current source 54 and the second current source 52 are also equal. That is, voltage drops across the first resistor 62 and the second resistor 60 are equal. However, the current of the first current source 54 also passes through the third resistor 64, so that a bias voltage dV is generated. The third resistor 64 can be an external resistor, and the bias voltage dV is adjusted according to actual circuit designs. While no current or an insufficient current which is less than the predetermined maximum current passes through the current detecting resistor 18, since the bias voltage dV is greater than a voltage difference across the current detecting resistor 18, the voltage level of the connection point S1 is lower than the voltage level of the connection point S2. Accordingly, the comparator 66 outputs the current trigger signal Itr with a low level, and the processing circuit 5 controls the switch 12 according to the voltage detecting signal VFB. While the current passing through the current detecting resistor 18 is greater than the predetermined maximum current, since the bias voltage dV is smaller than the voltage difference across the current detecting resistor 18, the voltage level of the connection point S1 is higher than the voltage level of the connection point S2. Accordingly, the comparator 66 outputs the current trigger signal Itr with a high level. Meanwhile, the processing circuit 5 immediately cuts off the switch 12, so that an excess current is avoided. While the current passing through the current detecting resistor 18 is less than the predetermined maximum current again, the processing circuit 5 returns to control the switch 12 according to the voltage detecting signal VFB.

Figure 4:
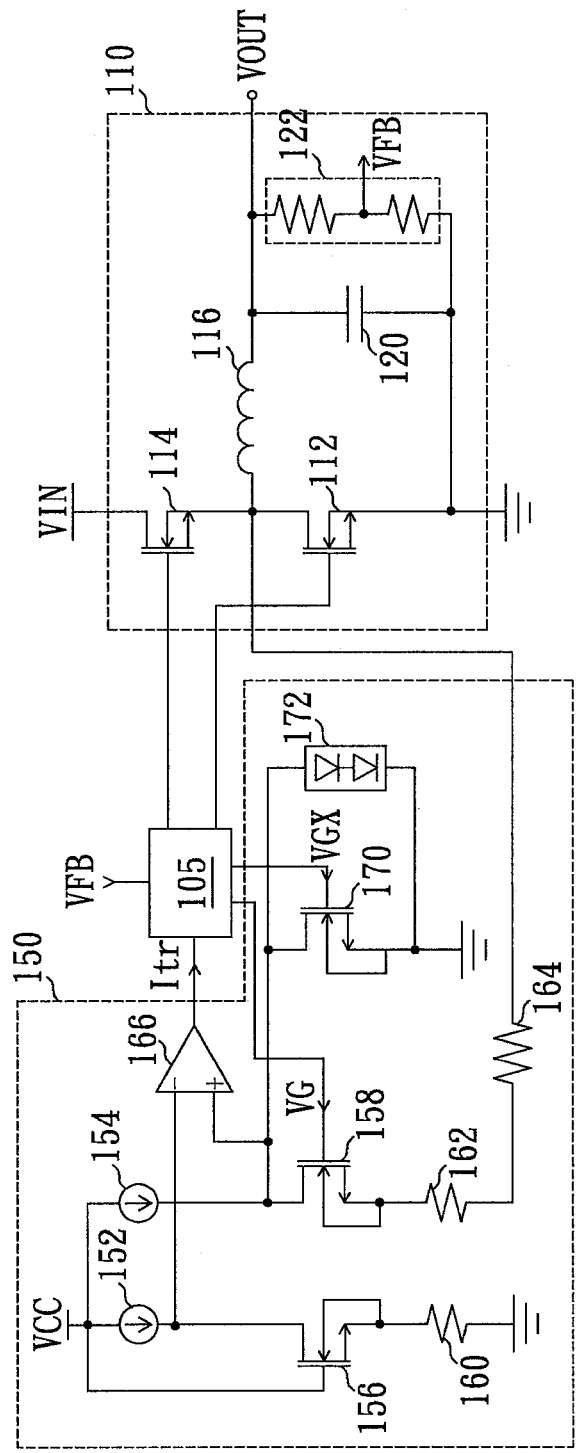
FIG. 4 is a schematic circuit diagram of a switching power converter including a current trigger circuit according to a second exemplary embodiment consistent with the present invention.

As previously mentioned, the two current sources respectively providing the equal currents, which correspondingly pass through the different resistances (the first resistor 62 and the third resistor 64 are deemed as a resistor), are used in the current trigger circuit of the exemplary embodiment consistent with the present invention, so that the different voltage drops are generated. Currents are then detected by comparing the bias voltage provided by the bias voltage unit with the voltage difference across the current detecting element. Certainly, the currents of the first current source 54 and the second current source 52 may also not be equal. The current ratio thereof may be inversely proportional to the resistor ratio of the first resistor 62 and the second resistor 60. As a result, the voltage drops across the first resistor 62 and the second resistor 60 are still equal, so that the operation of the current trigger circuit of the exemplary embodiment consistent with the present invention is not functionally affected. Furthermore, through the voltage drops across the first resistor 62, the second resistor 60, and the third resistor 64, the voltages levels of the first detecting end and the second detecting end of the current detecting resistor 18 are offset, so that the levels of the received signals can be processed by the comparator 66. Accordingly, the issue of the detected signals with excessively high or low voltage levels can be resolved (please refer to the embodiment of FIG. 4).

Any element, of which the voltage difference is generated across the two terminals, such as a resistor, a transistor, and etc., is coupled to the current trigger circuit of the exemplary embodiment consistent with the present invention, so that the current is detected. Please refer to FIG. 4, which is a schematic circuit diagram of a switching power converter including a current trigger circuit according to a second exemplary embodiment consistent with the present invention. In the present embodiment, a conductive resistance between a drain and a source of a detecting transistor switch is used to detect the current. The switching power converter includes a processing circuit 105, a converting circuit 110, and a switching power converter 150. The converting circuit 110 of the present embodiment is a buck DC/DC converting circuit including a first switch 112, a second switch 114, an inductor 116, an output capacitor 120, and a voltage detecting circuit 122. The converting circuit 110 is used to step down an input voltage VIN to become an output voltage VOUT to be output. The first switch 112 and the second switch 114 are switched according to control signals generated by the processing circuit 105. In the present embodiment, the first switch 112 and the second switch 114 are both MOS transistors, and each of them has a source, a drain, and a gate. The current trigger circuit 150 includes a bias voltage unit and a trigger unit, wherein the bias voltage unit includes a first current source 154, a second current source 152, a first resistor 162, a second resistor 160, a first transistor switch 158, a second transistor switch 156, a third resistor 164, a third transistor switch 170, and a voltage clamping element 172. The first current source 154, the first transistor switch 158, the first resistor 162, and the third resistor 164 are sequentially coupled in series, and the second current source 152, the second transistor switch 156, and the second resistor 160 are also sequentially coupled in series. One terminal of the first current source 154 is coupled to a supply voltage VCC, and one terminal of the second current source 152 is also coupled to the supply voltage VCC. One terminal of the third transistor switch 170 and one terminal of the voltage clamping element 172 are coupled to the drain of the first transistor switch 158, and the other terminal of the third transistor switch 170 and the other terminal of the voltage clamping element 172 are grounded. The trigger unit includes a comparator 166. The third resistor 164 is coupled to a drain of the first switch 112, and the second resistor 160 is coupled to a source of the first switch 112, i.e., the ground. A non-inverse terminal of the comparator 166 is coupled to the connection point between the first transistor switch 158 and the first current source 154, and an inverse terminal of the comparator 166 is coupled to the connection point between the second transistor switch 156 and the second current source 152. The comparator 166 generates a current trigger signal Itr according to a comparison result of voltage levels of the two connection points. A gate of the second transistor switch 156 is coupled to the supply voltage VCC, so that the second transistor switch 156 is conductive. A gate of the first transistor switch 158 receives a trigger control signal VG generated by the processing circuit 105, so that the current trigger circuit 150 detects or stops detecting according to the trigger control signal VG conducting or cutting off the first transistor switch 158. Meanwhile, the processing circuit 105 generates a voltage clamping signal VGX to switch the third transistor switch 170, wherein the voltage clamping signal VGX and the trigger control signal VG have opposite phases. The processing circuit 105 receives a voltage detecting signal VFB generated by the voltage detecting circuit 122 and the current trigger signal Itr so as to generate the control signal OUT to switch the first switch 112 and the second switch 114. Accordingly, the output voltage VOUT is regulated at a predetermined output voltage.

While the second switch 114 is cut-off, the first switch 112 is conductive, so that a current passes through the inductor 116 continues passing through a loop of the output capacitor 120 and the first switch 112. Meanwhile, a voltage difference between the drain and the source of the first switch 112 exists. Accordingly, a voltage level of the source of the first switch 112 is higher a voltage level of the drain thereof. That is, the voltage level of the drain thereof is lower than the ground. Here, the processing circuit 105 outputs the trigger control signal VG with a high level to turn on the first transistor switch 158 to detect the voltage difference, and the voltage clamping signal VGX with a low level to cut off the third transistor switch 170. Since the voltage drop formed by the current of the first current source 154 passing through the third resistor 164 is insufficient to compensate the voltage difference across the drain and the source of the first switch 112, the comparator 166 outputs the current trigger signal Itr with a low level. While electric power stored in the inductor 116 is gradually released, the current of the inductor 116 is decreased, so that the voltage difference across the drain and the source of the first switch 112 gradually reduced. While the voltage difference across the drain and the source of the first switch 112 is equal to or less than the voltage drop across the third resistor 164, the comparator 166 outputs the current trigger signal Itr with a high level, so that the processing circuit 105 cuts off the first switch 112. Thereby, the current generated by the output capacitor 120 can be prevented from inversely flowing through the inductor 116 and the conductive first switch 112 after the electric power stored in the inductor 116 is completely released.

Furthermore, while the second switch 114 is conductive, it transmits electric power of the input voltage VIN to the inductor 116 and the output capacitor 120 through the second switch 114. In the meanwhile, the first switch 112 is cut-off. Meanwhile, the processing circuit 105 outputs the trigger control signal VG with a low level to cut off the first transistor switch 158 to stop detecting, and outputs the voltage clamping signal VGX with a high level to turn on the third transistor switch 170. Since the second switch 114 is conductive, the voltage level of the drain of the first switch 112 is raised to be nearly equal to the input voltage VIN. Meanwhile, the third transistor switch 170 is conductive, so that the voltage level of the drain of the first transistor switch 158 is almost equal to zero. A current from the input voltage VIN flows through the path of the third resistor 164, the first resistor 162, the body diode of the first transistor switch 158, and the third transistor switch 170. The voltage difference across the drain and the source of the first transistor switch 158 is the forward conductive voltage of the body diode of the first transistor switch 158. Accordingly, even though the input voltage VIN is considerably high, there is no excessively high voltage inputted to the current trigger circuit 150, and so the elements of the current trigger circuit 150 is protected from being damaged. The elements of the current trigger circuit 150 may be manufactured by performing a low voltage process to reduce the cost of the current trigger circuit 150. In order to avoid a high input voltage VIN to be inputted to the current trigger circuit 150 when there is a time interval between the first transistor switch 158 being switched and the third transistor switch 170 being switched, the voltage clamping element 172 ensures the voltage level of the drain of the first transistor switch 158 to be clamped at a voltage equal to or lower than a clamping voltage of the voltage clamping element 172 at any time.

Figure 5:
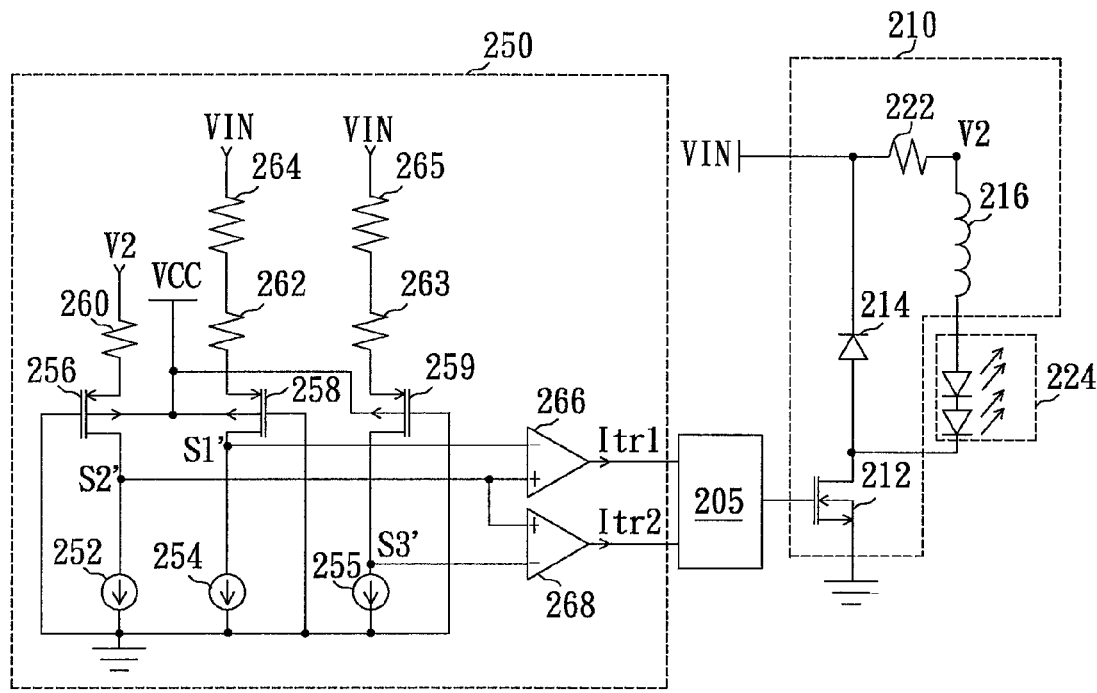
FIG. 5 is a schematic circuit diagram of a switching power converter including a current trigger circuit according to a third exemplary embodiment consistent with the present invention.

Please refer to FIG. 5, which is a schematic circuit diagram of a switching power converter including a current trigger circuit according to a third exemplary embodiment consistent with the present invention. In the present embodiment, the current trigger circuit 250 has two bias voltages with different values, so that the detected current is limited within a predetermined range. In the present embodiment, the switching power converter is a light-emitting diode driving circuit (an LED driving circuit) including a processing circuit 205, a converting circuit 210, and the current trigger circuit 250. The converting circuit 210, including a switch 212, a diode 214, an inductor 216, and a voltage detecting circuit 222, is used to drive an LED module 224. The switch 212 is switched according to a control signal generated by the processing circuit 205. The current trigger circuit 250 includes a bias voltage unit and a trigger unit, wherein the bias voltage unit includes a first current source 254, a second current source 252, a third current source 255, a first resistor 262, a second resistor 260, a third resistor 263, a fourth resistor 264, a fifth resistor 265, a first transistor switch 258, a second transistor switch 256, and a third transistor switch 259. The first current source 254, the first transistor switch 258, the first resistor 262, and the fourth resistor 264 are sequentially coupled in series, the second current source 252, the second transistor switch 256, and the second resistor 260 are sequentially coupled in series, and the third current source 255, the third transistor switch 259, the third resistor 263, and the fifth resistor 265 are sequentially coupled in series. One terminal of the first current source 254, one terminal of the second current source 252, and one terminal of the third current source 255 are grounded. The second resistor 260 is coupled to a first detecting end of the voltage detecting circuit 222 so as to receive a detecting signal V2. The fourth resistor 264 and the fifth resistor 265 are coupled to a second detecting end of the voltage detecting circuit 222 so as to receive an input voltage VIN. The trigger unit includes a first comparator 266 and a second comparator 268. An inverse terminal of the first comparator 266 is coupled to a connection point S1' between the first transistor switch 258 and the first current source 254, and a non-inverse terminal of the first comparator 266 is coupled to a connection point S2' between the second transistor switch 256 and the second current source 252. The first comparator 266 generates a first current trigger signal Itr1 according to a comparison result of voltage levels of the connection points S1' and S2'. An inverse terminal of the second comparator 268 is coupled to a connection point S3' between the third transistor switch 259 and the third current source 255, and a non-inverse terminal of the second comparator 268 is coupled to the connection point S2' of the second transistor switch 256 and the second current source 252. The second comparator 268 generates a second current trigger signal Itr2 according to a comparison result of voltage levels of the connection points S3' and S2'. A base of the first transistor switch 258, a base of the second transistor switch 256, and a base of the third transistor switch 259 are coupled to a supply voltage VCC, and a gate of the second transistor switch 256 is grounded, so that the second transistor switch 256 is conductive. The processing circuit 205 receives the first current trigger signal Itr1 and the second current trigger signal Itr2 to generate the control signal for controlling the switch 212. Accordingly, the current passing through the LED module 224 is regulated between a first predetermined current and a second predetermined current, wherein the first predetermined current is less than the second predetermined current.

In the present embodiment, resistances of the first resistor 262, the second resistor 260, and the third resistor 263 are equal, and currents of the first current source 254, the second current source 252, and the third current source 255 are equal. A resistance of the fourth resistor 264 is slightly less than a resistance of the fifth resistor 265. While the circuit is initially activated, the current passing through the LED module 224 is smaller than the first predetermined current and the second predetermined current, so that the voltage level of the connection point S2' is higher than the voltage levels of the connection points S3' and S1'. Meanwhile, the first current trigger signal Itr1 and the second current trigger signal Itr2 are both at high levels, so that the processing circuit 205 controls the switch 212 to be conductive, and the current passing through the LED module 224 is gradually raised. While the current passing through the LED module 224 is greater than the first predetermined current and the second predetermined current, the voltage level of the connection point S2' is lower than the voltage levels of the connection points S3' and S1'. Meanwhile, the first current trigger signal Itr1 and the second current trigger signal Itr2 are both at low levels, so that the processing circuit 205 controls the switch 212 to be cut-off. The electric power stored in the inductor 216 is released through a loop of the LED module 224 and the diode 214, and the current passing through the LED module 224 gradually decreases. While the current passing through the LED module 224 is greater than the first predetermined current but smaller than the second predetermined current, the voltage level of the connection point S2' is lower than the voltage level of the connection point S1' but higher than the voltage level of the connection point S3'. Here, the first current trigger signal Itr1 is at a low level, but the second current trigger signal Itr2 is at a high level. Meanwhile, the switch 212 controlled by the processing circuit 205 stays at the original state. Accordingly, the current passing through the LED module 224 is regulated between the first predetermined current and the second predetermined current.

Figure 6:
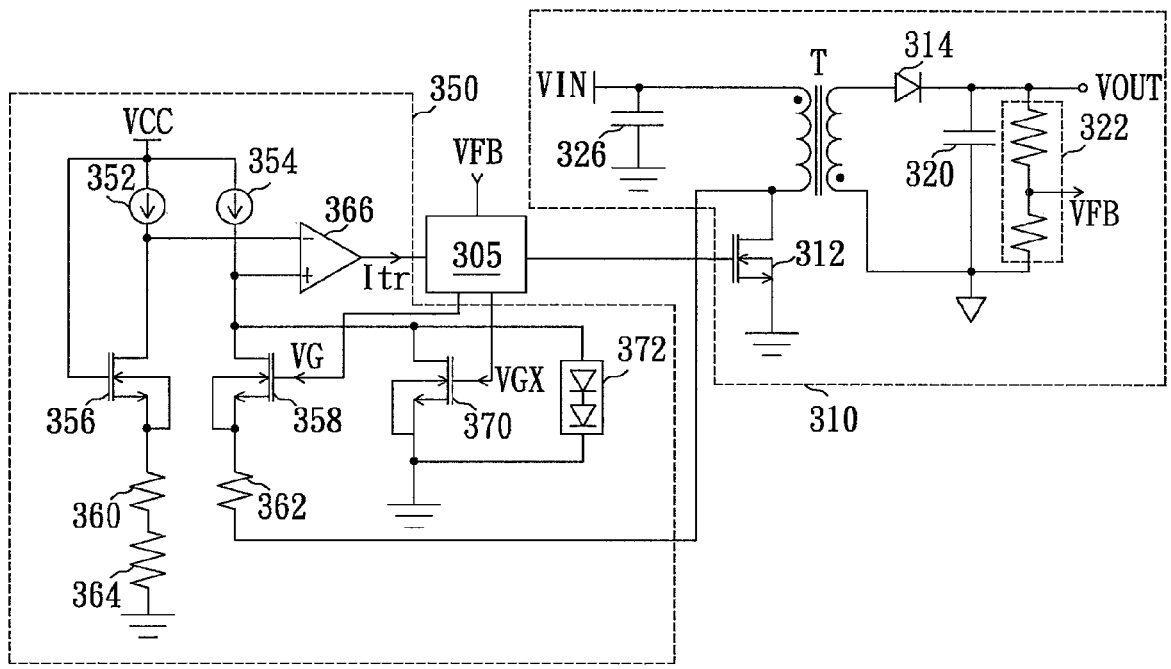
FIG. 6 is a schematic circuit diagram of a switching power converter including a current trigger circuit according to a fourth exemplary embodiment consistent with the present invention.

Please refer to FIG. 6, which is a schematic circuit diagram of a switching power converter including a current trigger circuit according to a fourth exemplary embodiment consistent with the present invention. In the present embodiment, the switching power converter is a flyback switching power converting circuit including a processing circuit 305, a converting circuit 310, and a current trigger circuit 350. The converting circuit 310 includes a switch 312, a diode 314, an output capacitor 320, a voltage detecting circuit 322, an input capacitor 326, and a transformer T. The switch 312 is switched according to a control signal generated by the processing circuit 305. The current trigger circuit 350 includes a bias voltage unit and a trigger unit. The bias voltage unit includes a first current source 354, a second current source 352, a first resistor 362, a second resistor 360, a third resistor 364, a first transistor switch 358, a second transistor switch 356, a third transistor switch 370, and a voltage clamping element 372. The first current source 354, the first transistor switch 358 and the first resistor 362 are sequentially coupled in series, and the second current source 352, the second transistor switch 356, the second resistor 360 and the third resistor 364 are also sequentially coupled in series. One terminal of the first current source 354 is coupled to a supply voltage VCC, and one terminal of the second current source 352 is also coupled to the supply voltage VCC. One terminal of the third transistor switch 370 and one terminal of the voltage clamping element 372 are both coupled to a drain of the first transistor switch 358, and the other terminal of the third transistor switch 370 and the other terminal of the voltage clamping element 372 are both grounded. The trigger unit includes a comparator 366. The second resistor 362 is coupled to a drain of the switch 312, and the third resistor 364 is coupled to a source of the switch 312, i.e. the ground. An inverse terminal of the comparator 366 is coupled to the connection point between the second transistor switch 356 and the second current source 352, and a non-inverse terminal of the comparator 366 is coupled to the connection point between the first transistor switch 358 and the first current source 354. The comparator 366 generates a current trigger signal Itr according to a comparison result of voltage levels of the two connection points. A gate of the second transistor switch 356 is coupled to the supply voltage VCC, so that the second transistor switch 356 is conductive. A gate of the first transistor switch 358 receives a trigger control signal VG generated by the processing circuit 305, so that the current trigger circuit 350 detects or stops detecting according to the trigger control signal VG conducting or cutting off the first transistor switch 358. Meanwhile, the processing circuit 305 generates a voltage clamping signal VGX to switch the third transistor switch 370, wherein the voltage clamping signal VGX and the trigger control signal VG have opposite phases. The processing circuit 305 receives a voltage detecting signal VFB generated by the voltage detecting circuit 322 and the current trigger signal Itr, so as to generate the control signal to switch the switch 312. Accordingly, an output voltage VOUT is regulated at a predetermined output voltage, and it is ensured that a current passing through the transformer T is not excessive.

While the switch 312 is conductive, electric power provided by an input voltage VIN is stored in the transformer T. Meanwhile, the output capacitor 320 provides an output voltage VOUT to a load (not shown). While the output voltage VOUT is lower than a predetermined voltage, or a current passing through the transformer T and the switch 312 is greater than a predetermined current, the processing circuit 305 controls the switch 312 to be cut-off. Meanwhile, electric power stored in the transformer T is released to the secondary side through a loop of the diode 314 and the output capacitor 320, so that the electric power is stored in the output capacitor 320, and the output voltage VOUT is raised. When the switch 312 is cut-off for a predetermined period, the switch 312 is turned on by the processing circuit 305 again. While the output voltage VOUT is again lower than a predetermined voltage, or a current passing through the transformer T and the switch 312 is greater than a predetermined current, the processing circuit 305 controls the switch 312 to be cut-off. The cycle is repeated, so that the output voltage VOUT is regulated near the predetermined voltage.

Next, the operation of the current trigger circuit 350 in the above-described process will be described hereinafter. While the switch 312 controlled by the processing circuit 305 is conductive, the current passes through the primary side of the transformer T and the switch 312. Meanwhile, the processing circuit 305 outputs the trigger control signal VG with a high level to control the first transistor switch 358 to detect, and outputs the voltage clamping signal VGX with a low level to cut off the third transistor switch 370. Since the voltage drop formed by the current of the first current source 354 passing through the third resistor 364 is greater than the voltage difference across the drain and the source of the switch 312, the comparator 366 outputs the current trigger signal Itr with a low level. While the output voltage VOUT does not achieve the predetermined voltage, but the current passing through the switch 312 achieves the predetermined current, the comparator 366 outputs the current trigger signal Itr with a high level, so that the switch 312 controlled by the processing circuit 305 is cut-off. While the switch 312 is cut-off, the processing circuit 305 outputs the trigger control signal VG with a low level to control the first transistor switch 358 to stop detecting, and outputs the voltage clamping signal VGX with a high level to turn on the third transistor switch 370. Since the switch 312 is cut-off, the voltage level of the drain of the switch 312 is raised to be nearly equal to the input voltage VIN. Here, the third transistor switch 370 is conductive, so that the voltage level of the drain of the first transistor switch 358 is almost equal to zero. The current from the input voltage VIN flows through the path of the first resistor 362, the body diode of the first transistor switch 358, and the third transistor switch 370 to ground. The voltage drop across the drain and the source of the first transistor switch 358 is the forward conductive voltage of the body diode of the first transistor switch 358. Accordingly, even though the input voltage VIN is considerably high, there is no excessively high voltage inputted to the current trigger circuit 350, and the elements of the current trigger circuit 350 are protected from being damaged. The elements of the current trigger circuit 350 may be manufactured by performing a low voltage process to reduce the cost of the current trigger circuit 350. In order to avoid a high input voltage VIN to be inputted to the current trigger circuit 350 when there is a time interval between the first transistor switch 358 being switched and the third transistor switch 370 being switched, the voltage clamping element 372 ensures the voltage level of the drain of the first transistor switch 358 to be clamped at a voltage equal to or lower than a clamping voltage of the voltage clamping element 372 at any time.

To sum up, in one exemplary embodiment consistent with the present invention, a bias voltage is compared with a voltage difference in a detecting element. A bias voltage unit is coupled to the detecting element, so that they have a common voltage level to avoid noises when the circuit is operating. Accordingly, the erroneous detection caused by the noise interference can be avoided. As a result, a detecting element with a low resistance, such as an MOEFET, can be used in one exemplary embodiment consistent with the present invention to decrease power consumption arisen from current detection and to further increase conversion efficiency.

As the above description, the present invention completely complies with the patentability requirements: novelty, non-obviousness, and utility. It will be apparent to those skilled in the art that various modifications and variations can be made to the structure of the present invention without departing from the scope or spirit of the invention. In view of the foregoing descriptions, it is intended that the present invention covers modifications and variations of this invention if they fall within the scope of the following claims and their equivalents.

What is claimed is:
1. A switching power converter, comprising:
   a converting circuit used to convert an input voltage with electric power to an output voltage with stable electric power according to a control signal, the converting circuit having a detecting element, and the detecting element having a first detecting end and a second detecting end;
   a current trigger circuit, comprising:
      at least one bias voltage unit, each of the bias voltage units coupled to the first detecting end and providing a bias voltage signal, wherein the at least one bias voltage unit comprises a first current source and a second current source; and
      a trigger unit coupled to the at least one bias voltage unit and generating at least one current trigger signal according to the voltage level of the first detecting end, a voltage level of the second detecting end, and the at least one bias voltage signal; and
   a processing circuit receiving the at least one current trigger signal generated by the current trigger circuit and generating the control signal according to the at least one current trigger signal,
   wherein the at least one current trigger circuit further comprises at least one first transistor switch and a second transistor switch, each of the first transistor switches is coupled to the first current source of the corresponding bias voltage unit and switched according to a trigger control signal, and the second transistor switch is coupled to the second current source and kept conductive.

2. The switching power converter as claimed in claim 1, wherein the detecting element is a switch, and the switch is switched according to the control signal.

3. The switching power converter as claimed in claim 2, wherein each of the bias voltage units further comprises a first resistor, the first current source provides a first current, and the first resistor is coupled to the first current source and the first detecting end, wherein each of the first resistors has a different resistance.

4. The switching power converter as claimed in claim 3, wherein the at least one current trigger circuit further comprises a second resistor, the second current source provides a second current, and the second resistor is coupled to the second detecting end and the second current source.

5. The switching power converter as claimed in claim 1, wherein the at least one current trigger circuit further comprises a voltage clamping element coupled to the at least one first transistor switch, so that a voltage drop across the at least one first transistor switch is clamped to be less than a predetermined voltage drop.

6. The switching power converter as claimed in claim 1, wherein the at least one current trigger circuit further comprises a third transistor switch coupled to the at least one first transistor switch and switched according to a voltage clamping signal, and the voltage clamping signal and the trigger control signal have opposite phases.

7. The switching power converter as claimed in claim 6, wherein the processing circuit generates the trigger control signal, so that the at least one first transistor switch and the switch are not conductive simultaneously.

8. The switching power converter as claimed in claim 4, wherein the first current and the second current of each the bias voltage units are equal, and resistances of the first resistor and the second resistor of each the bias voltage units are different.

9. A current trigger circuit, comprising:
a first current source used to provide a first current;
a first resistor coupled to the first current source for forming a first bias voltage, the first resistor being coupled to a first detecting end;
a second current source used to provide a second current;
a second resistor coupled to the second current source for forming a second bias voltage, the second resistor being coupled to a second detecting end;
a first transistor switch coupled to the first current source, and switched according to a trigger control signal;
a second transistor switch coupled to the second current source, and kept conductive; and
a first comparator coupled to the first resistor and the second resistor,
wherein a detecting current passes through a detecting element coupled between the first detecting end and the second detecting end, so that a detecting voltage is generated between the first detecting end and the second detecting end, and the first comparator outputs a first current trigger signal according to the detecting voltage, the first bias voltage, and the second bias voltage.

10. The current trigger circuit as claimed in claim 9, further comprising a voltage clamping element coupled to the first transistor switch, so that a voltage drop across the first transistor switch is clamped to be less than a predetermined voltage drop.

11. The current trigger circuit as claimed in claim 10, wherein the first current is equal to the second current, and resistances of the first resistor and the second resistor are different.

12. The current trigger circuit as claimed in claim 9, further comprising a third transistor switch coupled to the first transistor switch and switched according to a voltage clamping signal, and the voltage clamping signal and the trigger control signal having opposite phases.

13. The current trigger circuit as claimed in claim 9, wherein the first transistor switch and the second transistor switch are both metal-oxide-semiconductor transistors, a source and a base of the first transistor switch are connected, and a source and a base of the second transistor switch are connected.

14. The current trigger circuit as claimed in claim 9, further comprising:
a third current source used to provide a third current;
a third resistor coupled to the third current source for forming a third bias voltage, the third resistor being coupled to a third detecting end; and
a second comparator coupled to the third resistor and the second resistor, the second comparator outputting a second current trigger signal according to the detecting voltage, the third bias voltage, and the second bias voltage.

15. The current trigger circuit as claimed in claim 14, further comprising a fourth transistor switch coupled to the third current source and switched according to the trigger control signal.

16. A switching power converter, comprising:
a converting circuit used to convert an input voltage with electric power to an output voltage with stable electric power according to a control signal, the converting circuit having a detecting element, and the detecting element having a first detecting end and a second detecting end;
a current trigger circuit, comprising:
at least one bias voltage unit, each of the bias voltage units coupled to the first detecting end and providing a bias voltage signal; and
a trigger unit coupled to the at least one bias voltage unit and generating at least one current trigger signal according to the voltage level of the first detecting end, a voltage level of the second detecting end, and the at least one bias voltage signal; and
a processing circuit receiving the at least one current trigger signal generated by the current trigger circuit and generating the control signal according to the at least one current trigger signal,
wherein the converting circuit outputs an output current to a load, the at least one current trigger circuit has two bias voltage units used to provide a first bias voltage signal and a second bias voltage signal, the trigger unit generates a first current trigger signal and a second current trigger signal according to the first bias voltage signal and the second bias voltage signal, and the processing circuit generates the control signal according to the first current trigger signal and the second current trigger signal, so that the output current is controlled to be between a first current value and a second current value.

* * * * *